(12) United States Patent
Herslow

(10) Patent No.: US 7,287,704 B2
(45) Date of Patent: Oct. 30, 2007

(54) LASER MARKABLE SECURE DOCUMENTS

(75) Inventor: John H. Herslow, Scotch Plains, NJ (US)

(73) Assignee: Composecure, LLC, Mountainside, NJ (US)

( * ) Notice: Subject to any disclaimer, the term of this patent is extended or adjusted under 35 U.S.C. 154(b) by 140 days.

(21) Appl. No.: 11/120,760

(22) Filed: May 3, 2005

(65) Prior Publication Data
US 2006/0251869 A1 Nov. 9, 2006

(51) Int. Cl.
*G06K 19/06* (2006.01)

(52) U.S. Cl. ....................... 235/488; 235/492

(58) Field of Classification Search ................ 235/488, 235/492, 486, 487; 428/195.1, 704; 430/270.1
See application file for complete search history.

(56) References Cited

U.S. PATENT DOCUMENTS

2005/0003297 A1* 1/2005 Labrec .................... 430/270.1
2005/0040243 A1* 2/2005 Bi et al. .................... 235/492
2005/0095408 A1* 5/2005 LaBrec et al. ........... 428/195.1

* cited by examiner

*Primary Examiner*—Thien Minh Le
(74) *Attorney, Agent, or Firm*—Henry I. Schanzer

(57) ABSTRACT

Documents embodying the invention include a sandwich-like structure comprised of a core layer on which information may be printed using inks, a buffer layer bonded to each surface of the core layer for protecting the printed information and a laser reactive layer on, or in, which information can be written with a laser, bonded to each one of the buffer layers. The core layer may be formed of PVC (polyvinyl chloride) or PC (poly carbonate) material or any other suitable material on which information can be printed. The buffer layer may be formed of amorphous polyester material (e.g., PETG) or any other suitable material which can readily bond to the core layer and the laser reactive layer. The laser reactive layer may be polycarbonate (PC) or may be any other suitable plastic material (e.g., PVC, PET, PC, etc.) which includes a chemical which can react with a laser to produce desirable markings.

20 Claims, 7 Drawing Sheets

FIG 1A - PRIOR ART

LASER MARKABLE SECURE DOCUMENTS

BACKGROUND OF THE INVENTION

This invention relates to improved multi-layered (composite) documents and to apparatus and methods for the manufacture of composite (multi-layered) documents.

There is a growing need and/or desire to have documents which will typically last in excess of five years rather than the typical two years. To produce documents having greater strength and extended durability, the documents are typically formed with multi-layers, which are referred to as "composite" documents. The term "document" as used herein, and in the appended claims, refers to any identification or financial transaction device, including but not limited to national identification (ID) cards, college ID cards, smart cards, driver's licenses, passports, credit cards, documents for holding permanent and long lasting records such as medical records, and all types of security cards. These composite (multi-layered) documents are required to last for a long time even where high temperature levels (hot and cold) and/or a high degree of humidity may be encountered.

Existing problems with, and in, the manufacture of secure and rugged multi-layered documents of extended durability may be explained with reference to FIGS. 1A and 1B, which depict portions of known cards. Typically, these cards include a first core layer (e.g., of Polycarbonate-PC, or polyvinyl chloride-PVC, or polyester terephalate-PET material), 10, having top and bottom surfaces on which information may be printed. Additional layers, 21a, 21b, may be attached to the top and bottoms surfaces, respectively, of the core layer by means of an adhesive strip or coating (210a, 210b). The printed core layer 10 and the layers of adhesive coating (210a, 210b) may be subjected to a platen lamination for bonding all the layers together. However, the adhesive coating prevents a good bond from forming between the layers 21a, 21b and the ink covered core layer. Known conventional adhesives (210a, 210b) used to glue the different layers together have not been satisfactory because the adhesives tend to be moisture sensitive. That is, the exposed edge of each adhesive layer can absorb moisture. As a result, under extended heat or humidity conditions the adhesive bond is weakened and the document layers tend to separate.

A resultant problem with existing multi-layered documents whose layers are glued together is that they can be easily altered. Some of the layers can be removed by putting the documents in a steam chamber and then heating the documents. The layers on the documents can then be peeled off and new counterfeit layers can be mounted on, and added to, the remaining layers of the document. The use of adhesives to attach some of the layers together is problematic, particularly in the manufacture of high security documents, since the adhesives are moisture sensitive and subject to being "peeled", as noted above, using a steam chamber or like delaminating means. It is therefore desirable and/or necessary that the multi-layered documents not be sensitive to moisture.

Another problem with presently known security documents relates to the use of a layer of laser reactive material attached via an adhesive to a core layer, as shown in FIG. 1B. Typically, a pattern may be printed on at least one of the top and bottom surfaces of the core layer (e.g., a white PC or PVC layer), 10, using "printing" ink. Subsequently laser reactive layers, 12a, 12b, may be attached via adhesive strips 210a, 210b to the printed core layer(s), 10, and a laser may be used to write or print information on and within the laser reactive layer, 12. The laser reactive material tends to heat up when the layer, 12a, 12b, is "written" or "printed". The heat is transferred to the adhesive coating and the printing ink. This may cause (gas) bubbles to be formed within, and between, the layers by the printing ink and/or by the adhesive, which render the document useless. To prevent over-heating the ink and the adhesive and the destruction of the document, the speed of the laser writing must be slowed. This requires, for example, either the slowing of the scan speed or a reduction in the laser power used to write, whereby multiple passes may be required to print or write data on the document. Doing this substantially increases the time and cost of manufacturing products and still does not result in the production of secure and durable documents.

The problems discussed above are overcome in composite documents formed in accordance with the invention.

SUMMARY OF THE INVENTION

Documents embodying the invention include a core layer, having top and bottom surfaces, on which information may be printed by offset and/or screen printing using printing ink. A buffer layer, selected from materials which can form a permanent bond with the core layer, without the need of adhesive, is bonded to each one of the top and bottom surfaces of the core layer. Bonding of the core and buffer layers avoids the problem of delamination due to moisture and heat. Furthermore, the buffer layers function to diffuse heat applied to the buffer layer (such as the heat due to laser writing), thereby reducing the amount of heat transferred to the printing ink on surfaces of the core layer. Still further, the buffer layers are symmetrically located (above and below) about the core layer and function to diffuse heat applied to the buffer layer, thereby reducing the amount of heat transferred to the printing ink on surfaces of the core layer.

A laser reactive layer on which information may be engraved by a laser may be bonded to the outside surfaces of each one of the buffer layers. The heat, due to the laser writing/printing, is diffused within the laser reactive layer and the underlying buffer layer, whereby the heat from the laser writing transferred to the ink on the core layer is greatly reduced and does not cause significant alteration to the printing ink.

A document embodying the invention may include a sandwich-like structure comprised of a core layer on which information is printed using inks, a laser reactive layer on, or in, which information can be written with a laser, and a buffer layer interposed between the core layer and the laser reactive layer and bonded to each of these layers. The core layer may be formed of PVC (polyvinyl chloride) or PC (poly carbonate) material or any other suitable material on which information can be printed. The buffer layer may be formed of amorphous polyester material (e.g., PETG) or any other suitable material which can readily bond to the core layer and the laser reactive layer. The laser reactive layer may be polycarbonate (PC) or it may be any other suitable plastic material (e.g., PVC, PET, etc.) which includes a chemical which can react with a laser to produce desirable markings.

In particular embodiments of the invention, the buffer layer is a layer of PETG (glycol-modified polyethylene terephthalate). PETG has many desirable properties which makes it very advantageous for use as a buffer between the core layer, (which may be of PVC or PC material), and any other layer of a document, including the laser reactive layer (which may be of PC material). The desirable properties of PETG include:

1—It is a solid material with a high flashpoint not easily vaporized by the laser (as opposed to adhesives which have residual organic solvents or water).

2—It offers excellent adhesion to most polymeric materials typically used in document constructions, e.g., PVC, PET, PC, etc.

3—It is a component of a less expensive (FIG. 2-5) construction; at current pricing, PETG is less expensive than adhesive coated PC.

4—It acts as a leveling agent which results in a flatter document (i.e. fewer surface defects, especially with electronic inserts or embedded liquid crystal devices and/or any Optically Variable Devices (OVDs) inserted within the document.

5—It can be processed with standard PVC equipment since the composite structure does not require high temperature laminators and special diecutters.

6—Composite materials are inherently higher security, as a counterfeiter can easily and knowingly obtain 100% Polycarbonate and have an easy start to produce counterfeit documents. With composites they must identify and skillfully combine 2, 3 or more materials to faithfully recreate a document.

7—All current printed constructions of 100% PC documents do not withstand severe service testing as outlined in ISO 7810/10373. Printed 100% PC documents, formed of PC material, delaminate into separate layers when subjected to a steam chamber delamination process because the adhesive portion is moisture sensitive.

Therefore, documents embodying the invention include a buffer layer of amorphous polyester material bonded to a core layer (which may be of PVC or PC material). The core and buffer layers are "sandwiched" with a laser reactive layer (which may be of PC material) and any other layers to form the desired document. In all cases the buffer layer is made up of a material to:

a—Reduce or mitigate stress at its interface with all other layers overlying and/or underlying the buffer layer (e.g., a layer of laser reactive PC material on one side and a layer of PVC, or PC, material on the other side) to provide greater document durability;

b—Enable the laser writing, or marking, of the laser reactive PC layer, with higher quality and/or at a higher laser marking speed;

c—Reduce overall cost;

d—Enable processing on readily available equipment; and e—Provide greater document security.

Composite documents formed in accordance with the invention have a structure which, under normal wear and tear, are durable for an extended period of time (e.g., in excess of 5 years) and are relatively inexpensive to manufacture.

BRIEF DESCRIPTION OF THE DRAWINGS

In the accompanying drawings like reference characters denote like components; and FIGS. 1A and 1B are cross-sectional diagrams of parts of a prior art document;

DETAILED DESCRIPTION OF THE INVENTION

Note that some desirable features of multi-layered documents have been disclosed in U.S. Pat. No. 6,644,552 titled Composite Card, issued to the Applicant of this application, and whose teaching are incorporated herein by reference. This application relate to improvements to a composite card or multi-layered documents. Particular problems addressed and resolved in the present invention pertain to improvements related to laser writing/printing in, and on, certain layers of the document without adversely affecting information printed on the core layer of the document and ensuring the bonding of the layers of a document so it is not readily susceptible to humidity and temperature problems.

Figure 1B:
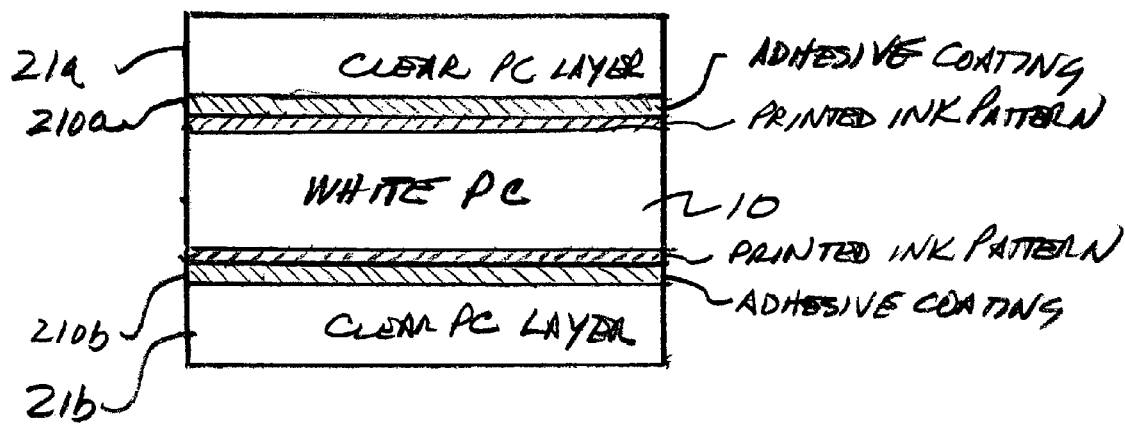
Figure 1B:
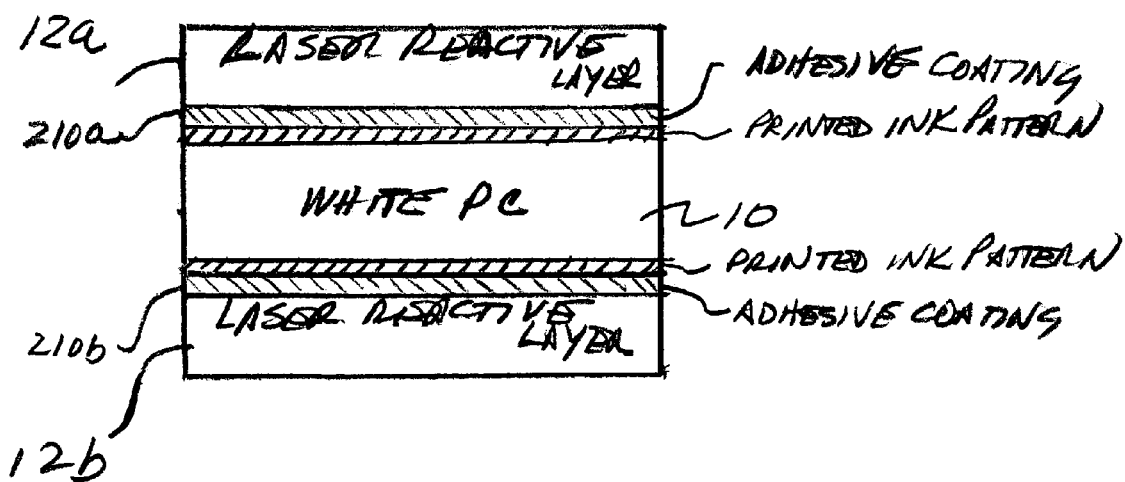
Figure 2:
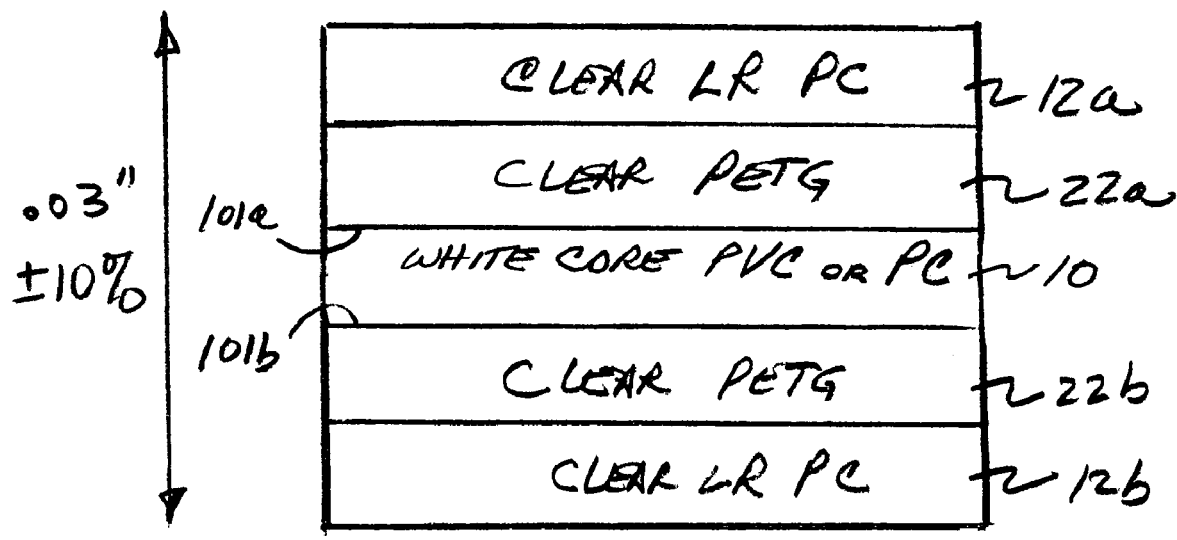
FIGS. 2 and 2A are cross-sectional diagrams (not to scale) of a document formed in accordance with the invention.
Figure 2A:
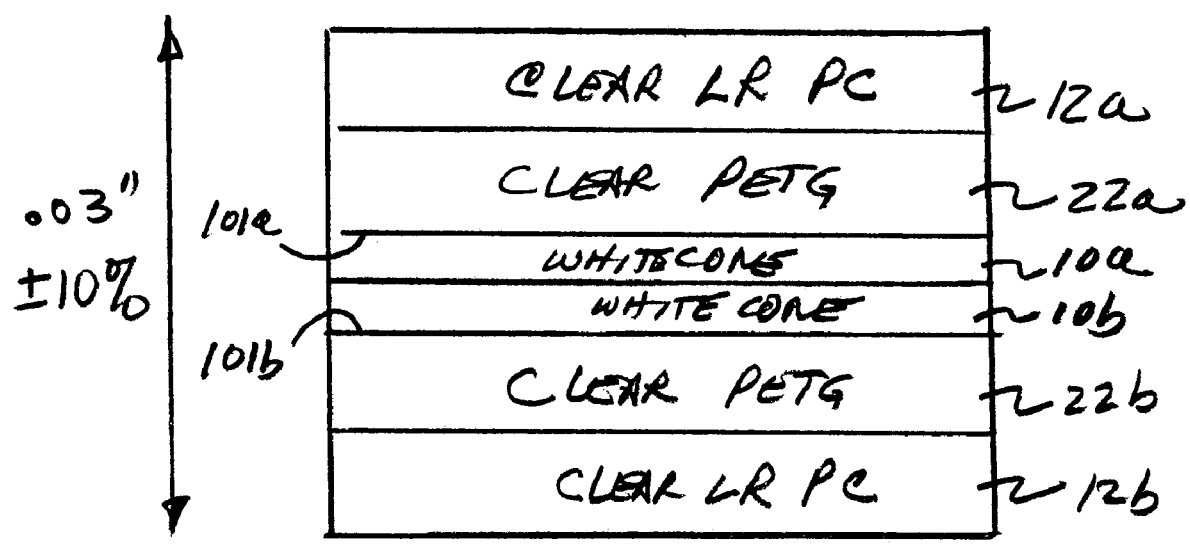

A multi-layered document embodying the invention may be formed as shown in FIG. 2. The thickness of the documents embodying the invention may be in the range of 0.03 inches (+/-10%). Different layers of material of varying thickness may be used to form the sandwich-like documents. In FIG. 2, the document includes a core layer which may be a single solid core 10. Alternatively, the core may be a split core 10a, 10b, as shown in FIG. 2A, or the core 10 may be formed of two, or more, sheets where the thickness of the two (or more) split portions (or multiple sheets) equals the thickness of the single solid core of FIG. 2.

In the embodiment shown in FIG. 2 the core 10 is comprised of a core layer 10 of white PVC material. Note that reference to PVC material as used herein, and in the appended claims, refers to polyvinyl chloride or to a compound thereof and may also include polyvinyl chloride acetate (PVCA) or like polymers or copolymers. Alternatively, also as shown in FIG. 2, the core 10 may be made of 100% polycarbonate (PC) (no composite); or, the core 10 may be formed of a "composite" including either: (a) thermoplastic polyesters such as amorphous PET; or (b) glycol-modified polyethylene terephthalate (PETG).

The thickness of the core 10 may range from less than 0.004 inches to 0.026 inches, or more. If multiple core sheets of PC are included to form the core 10, then they must be joined at the interfaces by more amorphous polyester due to the higher laminating temperatures (e.g., 385 degrees F.) required for the PC material. In all instances the "white" core layer is such that Information can be written on either one, or both, of the top and bottom surfaces of the core layer using printing ink. Typically, fixed information may be applied to either one, or both, of the outer surfaces (101a, 101b) of core layer 10 by offset and/or screen printing. In accordance with the invention, the printed information is maintained inviolate and preserved even though additional layers are subsequently formed over the printed matter and the core layer undergoes additional subsequent processing steps.

PVC or PC materials are preferred for forming the core layer. However, other materials such as amorphous PET, or oriented PET (OPET) or styrene or any polymer on which information may be written with printing ink, and to which the PETG material can adhere, may be used.

In FIG. 2, a clear buffer layer (22a, 22b), of glycol-modified polyethylene terephthalate (PETG), having properties of the type discussed above and as further discussed below, is attached (bonded) to each one of the top and bottom surfaces of the core 10. Each PETG buffer layer may range from less than 0.002 inches to more than 0.008 inches. In general, in documents formed in accordance with the invention, a PETG buffer layer is disposed between a core layer (which could be PVC or PET or PC) and any other overlying or underlying layer. The document shown in FIG. 2 is "symmetrical" in that for each layer placed on one side (e.g., top) of the core 10, a like layer is placed on the other side (e.g., bottom) of the core 10.

In FIG. 2, a clear laser reactive PC layer 12a is attached (bonded) to the top side of buffer layer 22a and a clear laser reactive PC layer 22b is attached (bonded) to the bottom side of buffer layer 22b. Each laser reactive layer may range from less than 0.001 inches to more than 0.008 inches. However, in the embodiment of FIG. 2, the laser reactive layer would preferably not be thicker than 0.004 inches.

The laser reactive layers (12a or 12b) are intended to enable a laser to write (variable) information on the document (e.g., to personalize the document). The laser reactive layers 12a, 12b, contain a chemical which causes blackening of the layer when a beam from a laser is beamed on ("exposes" or "irradiates") the laser reactive layer. This enables variable information to be written on, and within, the laser reactive layers. This is typically used for personalization and can be used for subsurface and or tactile marking including high resolution photos. For example, using a YAG laser of commercial manufacture (DataCard, G & D, Virtek, FOBA, General Scanning, etc) with a document transport and a suitable computer system with appropriate software, the document is transported beneath a laser and the laser reactive layer portion of the printed card material is engraved (written or marked) by the laser. By varying the laser power, special effects, such as tactile features can be created by the laser. After writing on one side, the document can be turned over to the opposite side to "laser" (write) the back. Also, multiple lasers (3 or more) can be used to increase production or create other special effects. After writing the desired information on the document, it can then be transported to an end user.

It should be appreciated that the heat generated during the laser writing cycle is absorbed and diffused by the laser reactive layer (12a, 12b) and by the underlying buffer layer (22a, 22b) interposed between the laser reactive layer (12a, 12b) and the core layer (10). Due to the buffer layer (22a, 22b), the heat generated by the laser writing is not directly applied or transmitted to the printing ink on the (top or bottom) surfaces of the core layer. Also, the PETG layers, 22a, 22b, are bonded (not glued by adhesive) to the core and laser reactive layers. Hence, this reduces the possibility of a chemical reaction (e.g., gas and bubble production) present in the prior art, due to the adhesive.

The PETG buffer layer functions as a solid adhesive for forming a solid, integral, bond with the white core layer (PC overlay) and with the printing ink on the white core material below the buffer. In documents embodying the invention the layers are integrally bonded to each other via heating and melting and intermingling of the polymers under controlled conditions. Metal plates are used to hold the multi-layered structure and to apply the requisite amount of heat to effectuate the bonding of the different layers so they can essentially not be separated. This process may be referred to as platen lamination.

As noted, when the platen lamination process step is applied to a prior art document in which one or more layer is glued to another, using a conventional adhesive, the "integral" bonding of the glued layers is not achieved. In accordance with the invention, using a PETG buffer layer eliminates the need for an adhesive strip. Subsequently, heat and/or moisture will not be easily absorbed and hence will not cause the layers to separate. Thus each PETG layer (22a, 22b) provides improved bonding to a Laser reactive PC layer (12a, 12b), or any suitable layer of material, attached (bonded) to one of its sides. Likewise, each PETG layer (22a, 22b) provides improved bonding to a core layer (e.g., of PVC, PET, or PC material), 10, attached (bonded) to its other side.

A PETG layer, disposed between a core layer and a laser reactive layer, is generally selected to have temperature and stress responsive properties intermediate those of the core layer (e.g., PVC) and the laser reactive layers (e.g., of PC material). By way of example, where the temperature coefficient of the laser reactive PC is in the range of $6.5 \times 10^{-5}$ cm per cm for each degree Centigrade (i.e., a one centimeter sample, when heated, will expand 0.000065 centimeters for every ° C. of heat rise) and the temperature coefficient of PVC is in the range of $9.0 \times 10^{-5}$ cm per cm for each ° C., then the PETG buffer layer will be made to have a temperature coefficient somewhere in the range of $7.0 \times 10^{-5}$ cm per cm ° C.). That is, where one centimeter of laser reactive PC and one centimeter of PVC, when heated, expand by 0.000065 centimeters and 0.00009 centimeters, respectively, a one centimeter sample of the PETG layer will expand by an amount which lies in a arrange between the change of the laser reactive PC and the PC or PVC.

In addition to the PETG layer having a specified temperature coefficient, it is relatively impervious to humidity; i.e., it has a low degree of moisture absorbance. As a result, a PETG layer protects the surface area of an associated PC or PVC layer from contact with and from absorbing humidity in the surrounding atmosphere. The PETG layer is also selected to be elastic and pliable so as not to be subject to "cracking" when it's associated laser reactive PC and PVC layers (as well as other materials) are subjected to bending and like stresses. The PETG buffer layer must also bond easily to PET, PVC, or any chosen material core layer. It is also desirable that the cost of the PETG buffer layer be less than the cost of the laser reactive PC.

Applicant discovered that materials suitable for forming a (PETG) buffer layer having the properties discussed above include practically all grades of PETG. Desirable properties of the PETG material may include the following:

a—Be available in sheets or rolls of thickness 0.002" (50μ) or less;

b—Be of premium grade with high tear and impact properties; and c—The (PETG) buffer material used to practice the invention may be stretched during the course of being manufactured preferably in two directions (e.g., the "machine direction" which may be defined as the direction in which the buffer material is being drawn through a processing machine and the "transverse direction" which is generally perpendicular to the machine direction) and preferably heat annealed to prevent stress cracking.

The thickness of each buffer layer may vary over a wide range [e.g., from less than 0.002 inches (50μ) to more than 0.004 inches (100μ)]. The limitation on the thickness of the buffer layer is determined by the maximum allowable thickness of the document (typically 0.030 inches) and the thickness of the core portion and outer layers [i.e., the PVC (or other core material) and laser reactive PC layers]. If the document includes electronics/chips/modules within the structure (see FIGS. 5 and 5A), the thickness of the buffer would have to be very limited and the thinnest possible commercially available PETG would be used in the application.

The material for forming the PETG layer may be selected from a wide range of amorphous material (i.e., generally the term "amorphous" means that the material is not oriented or thermoset like OPET). The buffer layer may be formed using amorphous polyesters, other than PETG, and/or "high" molecular weight polyethylene with acrylic acid, ethyl acrylate, or other similar adhesion promoters/modifiers.

Properties of the buffer layers used in documents embodying the invention include:

1—adhering properties required to bond to: (a) polycarbonate—an engineering material needed for laser marking; (b) PVC-used in practically all commercial forms used in the plastic document business; and (c) PET of the type which is commercially available and treated for adhesion and lamination receptivity;

2—Bond stress reduction properties such that layers of dissimilar materials are separated with "buffers" which ameliorate coefficient of expansion and contraction stresses.

3—Separate (insulate) the deleterious effects of intense localized laser marking heat in the Laser Reactive PC area, causing delamination at the white (possibly printed) internal surface, allowing higher quality and laser marking speed.

Figure 3:
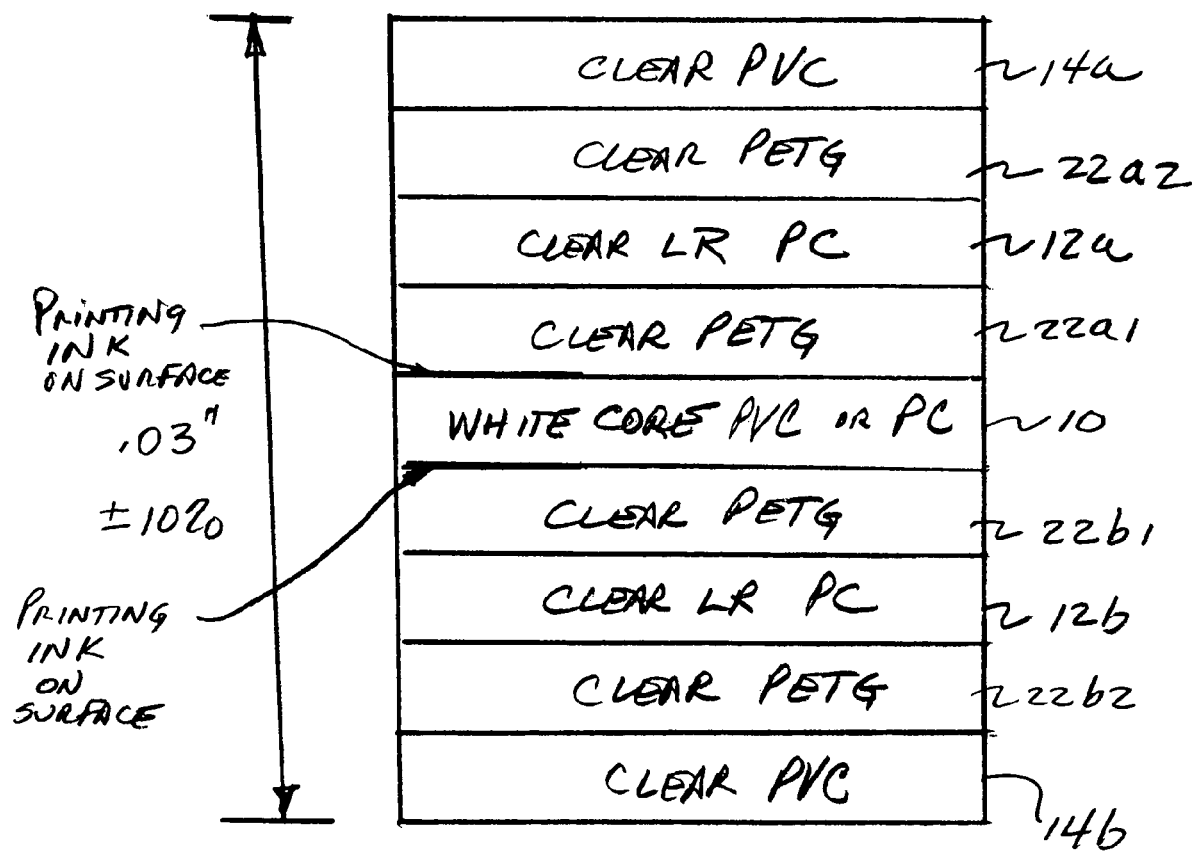
FIGS. 3 and 4 are cross-sectional diagrams (not to scale) of other documents embodying the invention.

FIG. 3 illustrates that, in addition to the layers shown in FIG. 2, a clear layer of PETG 22a2 may be formed above clear laser reactive layer 12a and a clear layer of PETG 22b2 may be formed below layer 12b. In addition, a clear layer of PVC material 14a may be formed above layers 22a2 and a clear layer of PVC material 14b may be formed below layer 22b2.

This structure allows for information to be written on the core layer using printing ink. In practice, the core layers (sheets), which can be comprised of any compound or polymer, (PVC, PET, PC, Teslin, etc.), are printed by offset and/or screen printing. The overlay sheets can be combined and sheeted, or sheeted individually then collated with the core sheets in proper order (if not done in an automated manner). Buffer layers (22a1, 22b1) may be added to the structure. Then, clear laser reactive layers (12a, 12b) may be added to the sandwich. Note that the laser reactive layers 12a, 12b can be laser written when the document is initially formed or at any time subsequent thereto. The laser markings may be below the surface of the laser reactive layer and may be formed by applying a laser beam through overlying layers covering (on top of) the laser reactive layer. Clear PETG layers (22a2, 22b2) may be attached to, and cover, a laser reactive layer to protect the laser markings. Then, outer PVC layers 14a, 14b, may be added to allow dye diffusion printing (thermal transfer) on the outside of the document, with the laser marks on the inside layers (12a, 12b) of the document. The PETG layers (22a1, 22a2, 22b1, 22b2) allow adhesion of the dissimilar materials. The composite multi-layered structure may be platen laminated and diecut. It is ready to be laser marked, if the desired laser markings were not previously written.

Figure 4:
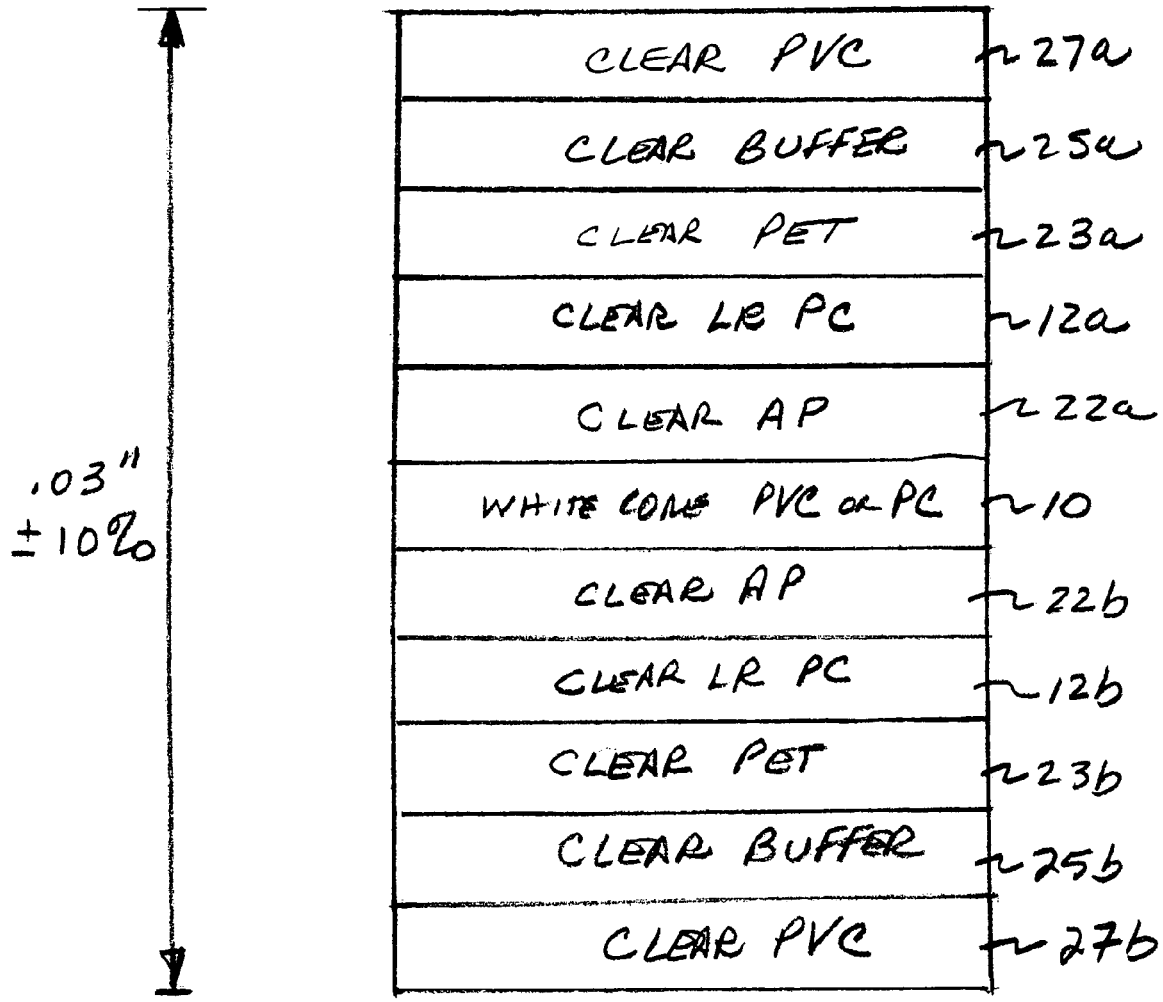

FIG. 4 shows another embodiment of the invention. It is similar to that shown in FIG. 2, but note that the buffer layers (22a, 22b) are indicated to be amorphous polyester (AP) which is the generic form of PETG. A clear layer of PET material 23a may be formed and bonded above layer 12a and a corresponding layer of PET material 23b may be formed and bonded below layer 12b. The PET layers are used to add strength to the document structure. [Note: a layer of PET may be replaced by a layer of polycarbonate. That is, whenever a layer of PET is shown, the layer may be replaced by a layer of polycarbonate. In this application and in the claims appended hereto, reference to PET also includes "oriented" PET (OPET) which refers to a thermoset material which has been formed by bi-axial stretching of the material (i.e., in the machine and transverse directions).] A clear buffer layer 25a of composite material may be formed and bonded above the PET layer 23a and a clear buffer layer 25b of like material may be formed and bonded below layer 23b. In addition, a clear PVC layer 27a may be formed and bonded above layer 25a and a clear PVC layer 27b may be formed and bonded below clear buffer layer 25b.

The combination of these layers imparts great strength and durability to the card structure at reasonable cost. This structure makes it possible to achieve a 10 year document body life with significant security. It is possible to both: (a) mark the document using a laser; and (b) thermal transfer print the document via dye diffusion. Of course, this is in addition to the information which is offset and/or screen printed on the core layer. In addition it is possible to mass transfer thermal information (e.g., bar code information or black type) which may be thermally printed on the outside PVC layer(s).

Figure 5:
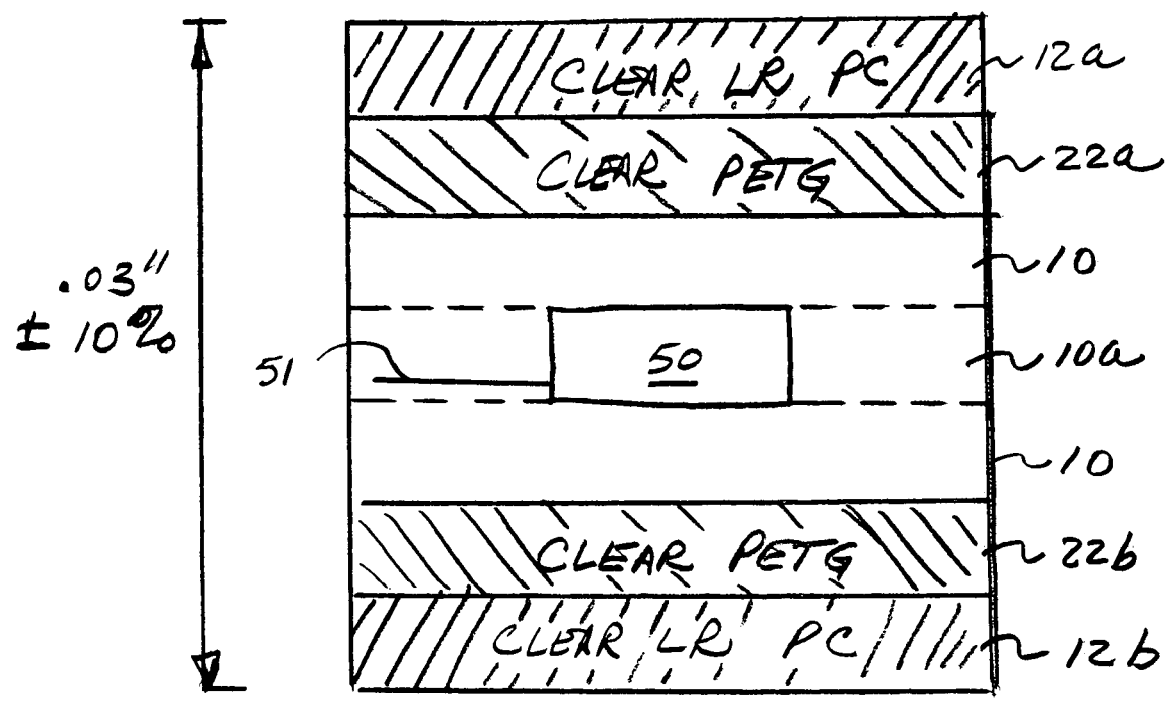
FIGS. 5 and 5A are cross-sectional diagrams (not to scale) of documents formed in accordance with the invention, including an embedded electronic module.

FIG. 5 illustrates that an electronic module 50 may be located within the core layer 10. Thus, in FIG. 5, the core PVC layer 10 includes three (3), or more, regions (10, 10a and 10). In the central region 10a there is centrally placed, or embedded, an electronic module 50 and antenna wire 51). The central region 10a and the module 50 are surrounded above and below by the material forming layer 10. Typically Layer 10 may include an electronic module 50 embedded in one layer of plastic with the antenna embedded in another portion of the plastic layer. Printed or blank sheets typically cover the electronic assembly 50 to form core layer 10. Alternatively, the module and the antenna 51 can be covered by other sheet(s) of plastic located on either side. These sheets may include adhesive coated fiberglass sheets such as "teslin" or "artisyn". As shown in FIG. 5, the core layer 10 surrounding the module is sandwiched between two layers of PETG (or any suitable amorphous polyester). The layers of the sandwich may include "glued" fiberglass sheet (Teslin), [note that the "glue" referred to here is a solid glue very much like PETG, not the adhesive referred to above, and may include polyethylene with acrylic additives] which may be compressed between plates placed under high pressure so the structure may maintain more flatness and the PETG (or the amorphous polyester) flows into the fiberglass glue. The PETG layer also aids in leveling the structure and coincidentally strengthening it. Clear laser reactive layers 12a, 12b may be added to the structure to enable personalized information to be selectively engraved on, or within, these layers. Thus, contained within the document are: (a) an electronic module and an antenna for radio frequency identification (RFID) and, also, the ability for additional communication, depending on the level of sophistication of the electronic module; (b) the capability of printing on the core layer; and (c) the capability of engraving a laser reactive layer.

Figure 5A:
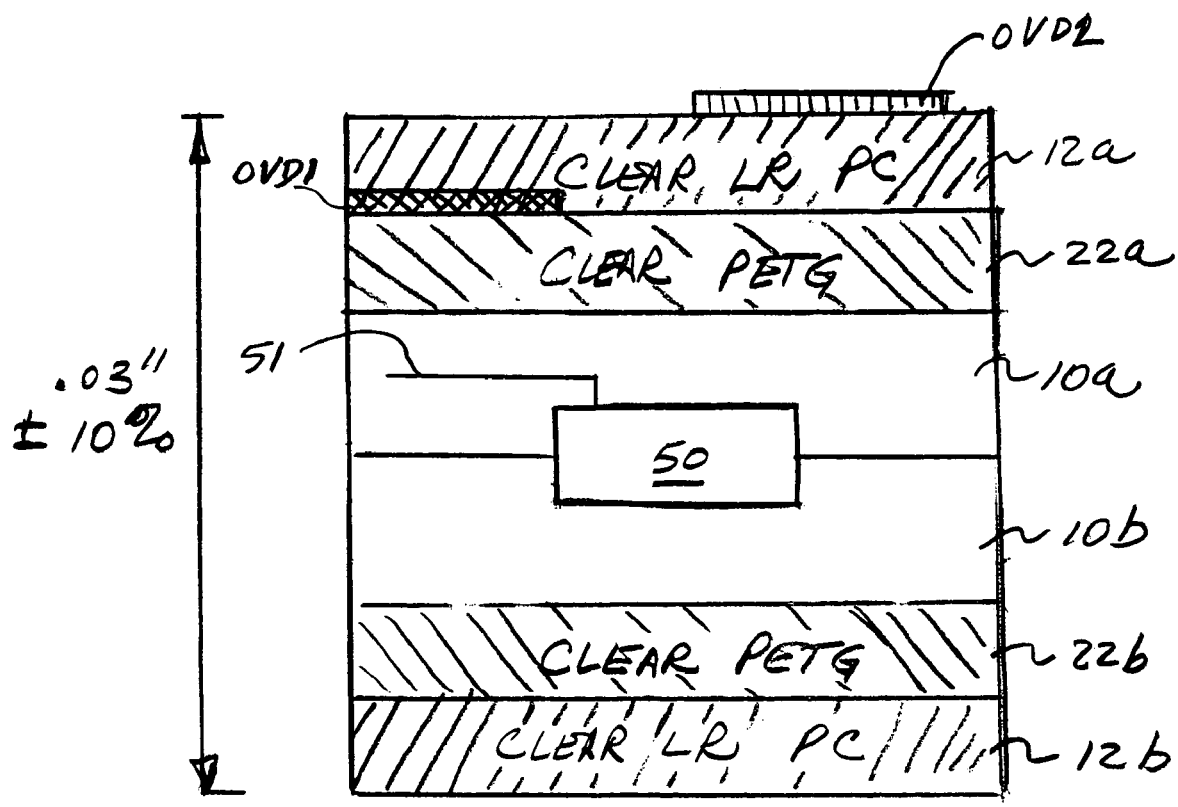

In addition, as shown in FIG. 5A, an optically variable device (OVD) may be placed on the outside layer of the document (OVD2) or within the document (OVD1). Also, in FIG. 5A, the electronic module and its associated antenna are centered within a split core layer, 10a, 10b, surrounded by glass fiber and/or teslin or artisyn material. Additionally, sheets of white PVC or PC material (layers 10a, 10b) are formed around the module and the antenna. As in FIG. 5 layers of PETG are formed above and below the core layer for bonding to the core layer and smoothing out surfaces of the document. Then an optically variable device (OVD1) may be placed above the PETG layer. In addition, a layer of laser reactive material 12a, 12b, may be formed on top of or below the PETG layers. Still further, an optically variable device (OVD2) may be attached to the top (or the bottom) surface of the laser layer 12a.

What is claimed is:

1. A multi layered document comprising:
a core layer of a first material having a top surface and a bottom surface, said core layer having information printed on at least one of its top and bottom surfaces with a printing ink;
first and second buffer layers of clear amorphous polyester material; each buffer layer having first and second surfaces and a predetermined thickness; the first surface of the first buffer layer being integrally bonded to the top surface of the core layer and the first surface of the second buffer layer being integrally bonded to the bottom surface of the core layer;
additional layers of clear material integrally bonded to the second surfaces of the first and second buffer layers; at least one of these additional layers including a layer of laser reactive material for enabling information to be engraved on the laser reactive material using a laser, and during the course of which heat is generated within the laser reactive layer; and
the buffer layers formed of non-laser reactive materials and being of sufficient thickness to protect the printing ink on the core layer from being adversely affected by the heat of the laser engraving in any of the other layers.

2. A multi-layered document as claimed in claim 1, wherein the clear amorphous polyester material forming the buffer layer is glycol-modified polyethylene terephthalate (PETG).

3. A multi-layered document as claimed in claim 2, wherein each PETG layer is at least 0.001 inches thick.

4. A multi-layered document as claimed in claim 2, wherein each core layer and each laser reactive layer has temperature and stress responsive properties; and wherein each PETG layer is selected to have temperature and stress responsive properties intermediate those of the core layer and the laser reactive layer between which it is interposed.

5. A multi-layered document as claimed in claim 4, wherein the structure of the multi-layered document is symmetrical with a like number of layers being formed above the core layer as below the core layer, and wherein said first material forming said core layer is one of polyvinyl chloride (PVC) and poly carbonate (PC); said core layer of first material having a first coefficient of expansion as a function of temperature.

6. A multi-layered document as claimed in claim 5, wherein said layer of laser reactive material includes one of polycarbonate (PC), polyvinyl chloride (PVC), polyester terephtalate (PET), and any other suitable plastic material formed so it can be selectively engraved by a laser.

7. A multi-layered document as claimed in claim 2, wherein a layer of laser reactive material is bonded to a buffer layer and wherein an additional layer of clear PETG is attached to each laser reactive layer, and an additional layer of clear polyvinyl chloride (PVC) is attached to each additional layer of clear PETG.

8. A multi-layered document as claimed in claim 1, wherein an additional layer of clear polyester terepthalate (PET) is attached to each laser reactive layer, and an additional layer of clear PETG is attached to each layer of PET, and an additional layer of clear polyvinyl chloride (PVC) is attached to each additional layer of clear PETG.

9. A multi-layered document as claimed in claim 4, wherein an additional layer of clear PETG is attached to each laser reactive layer, and an additional layer of clear polyvinyl chloride (PVC) is attached to each additional layer of clear PETG.

10. A multi-layered document as claimed in claim 1, wherein an electronic module is embedded within the core layer.

11. A method of forming a multi layered document comprising:
printing information with a printing ink onto at least one surface of a core layer of a first material having a top surface and a bottom surface;
bonding a first buffer layer onto the top surface of the core layer and a second buffer layer onto the bottom surface of the core layer; the bonding being via an adhesive-less heat lamination process; and the buffer layers being of clear amorphous polyester material; each one of the first and second buffer layers being of non-laser reactive material; and
bonding additional layers to the first and second buffers including at least one layer of clear laser reactive material for enabling information to be engraved on the laser reactive material using a laser and during the course of which heat is generated within the laser reactive layer; and the material and thickness of the associated buffer layer preventing the heat of the laser engraving from adversely affect the printing ink.

12. A method of forming a multi layered document as claimed in claim 11, wherein the core layer is one of polyvinyl chloride (PVC) and poly carbonate (PC); said core layer of first material having a first coefficient of expansion as a function of temperature; and wherein the buffer layer material is glycol-modified polyethylene terephthalate (PETG).

13. A method of forming a multi layered document as claimed in claim 11, wherein the multi-layered document is symmetrical with the same number of layers of similar dimensions being bonded to the top and bottom surfaces of the core layer; and wherein the buffer layer material is glycol-modified polyethylene terephthalate (PETG).

14. A multi layered document comprising:
a core layer of a first material having a top surface and a bottom surface, said core layer having information printed on at least one of its top and bottom surfaces with a printing ink; and said core layer of first material having a first coefficient of expansion as a function of temperature;
first and second buffer layers of clear amorphous polyester material and non-laser reactive material having a second coefficient of expansion as a function of temperature; said first buffer layer integrally bonded to the top surface of the core layer and the second buffer layer integrally bonded to the bottom surface of the core layer; and
a first set of additional layers integrally bonded to the first buffer layer and a second set of additional layers integrally bonded to the second buffer layer; at least one of said first and second sets of additional layers including a layer of clear laser reactive material having a third coefficient of expansion.

15. A multi layered document as claimed in claim 14 wherein the buffer layer material is glycol-modified polyethylene terephthalate (PETG), and wherein the integral bonding of each buffer layer to its respective core layer is by, adhesive-less, heat lamination.

16. A multi layered document as claimed in claim 15, wherein the first and second sets of additional layers have a like number of layers for forming a symmetrical structure relative to the core layer.

17. A multi layered document as claimed in claim 16, wherein the laser reactive material includes one of polycarbonate (PC), polyvinyl chloride (PVC), polyester terepthalate (PET), and any suitable plastic material which can be selectively engraved by a laser;
wherein the core layer material includes one of polyvinyl chloride (PVC) and poly carbonate (PC) and like material on which information may be printed; and
wherein the buffer material is one of a wide range of amorphous material including amorphous polyesters, PETG, "high" molecular weight polyethylene with acrylic acid, ethyl acrylate, and adhesion promoters/modifiers.

18. A multi layered document comprising:
a core layer of a first material having a top surface and a bottom surface, said core layer having information printed on at least one of its top and bottom surfaces with a printing ink;
a layer of clear laser reactive material for enabling information to be engraved on the laser reactive material using a laser, and during the course of which heat is generated within the laser reactive layer; and
a buffer layer of clear plastic, amorphous polyester, non-laser reactive material having first and second surfaces; one surface of said buffer layer bonded to the core layer and the other surface of the buffer layer bonded to the laser reactive material; the buffer material and its thickness being selected for protecting the printing ink on the core layer from being adversely affected by the heat of the laser engraving and the bonding of the buffer layer to the core layer and the laser reactive layer for rendering the multi-layered document relatively impervious to moisture absorption.

19. A multi layered document as claimed in claim 18, wherein the buffer layer of clear plastic material is clear amorphous polyester material and is integrally bonded via heat lamination to the core layer and to the laser reactive layer.

20. A multi layered document as claimed in claim 19, wherein the clear amorphous polyester material is PETG.

* * * * *